United States Patent [19]

Fouilloy et al.

[11] Patent Number: 5,149,969
[45] Date of Patent: Sep. 22, 1992

[54] INFRARED SURVEILLANCE DEVICE

[75] Inventors: Jean-Pierre Fouilloy, Velizy; Fernand R. Loy, Sceaux, both of France

[73] Assignee: Thomson-TRT Defense, Guyancourt, France

[21] Appl. No.: 640,146

[22] Filed: Jun. 14, 1984

[30] Foreign Application Priority Data

Jun. 14, 1983 [FR] France .................. 83 09821

[51] Int. Cl.⁵ .................. G02B 26/10; G02B 26/08; G02B 23/02
[52] U.S. Cl. .................. 250/334; 359/201; 359/202; 359/214; 359/218; 359/220; 359/401
[58] Field of Search .................. 350/6.4, 6.7, 6.8, 6.9, 350/6.91, 522, 539; 250/334; 359/201, 202, 214, 218, 220, 401

[56] References Cited
U.S. PATENT DOCUMENTS 2,997,537 8/1961 Wojcik .................. 350/539
4,300,160 11/1981 Pusch et al. .................. 350/6.8

Primary Examiner—Stephen C. Buczinski
Attorney, Agent, or Firm—Stevens, Davis, Miller & Mosher

[57] ABSTRACT

An infrared thermographic optical scanner is comprised of a first optomechanical device fitted with an entrance objective, at least a raster scan element, and a plane of infrared detectors on which the infrared radiation is focused in the form of lines. Further, there is provided a second optomechanical device made up of an orientable tilted periscope-head mirror and a derotator. The derotator is maintained clamped with respect to the head mirror coupling means for operation in the panoramic mode in a predetermined first angular position such that all lines scanned are parallel to each other, the raster scanning movement being obtained by maintaining the position of the raster element fixed, and by simultaneously causing the rotation of the head mirror, and at half-speed, causing the rotation of the derotator.

9 Claims, 2 Drawing Sheets

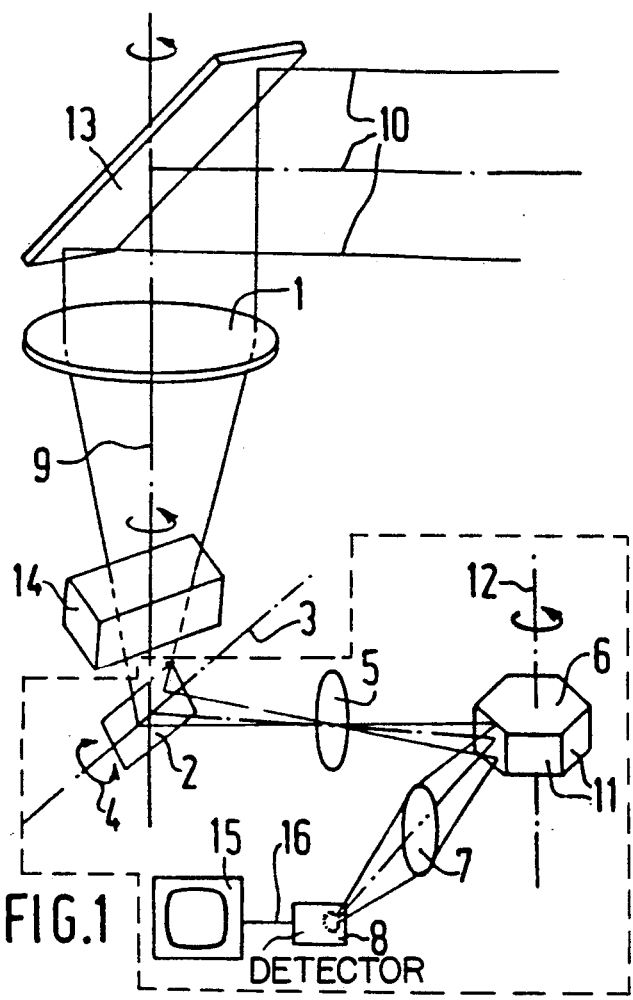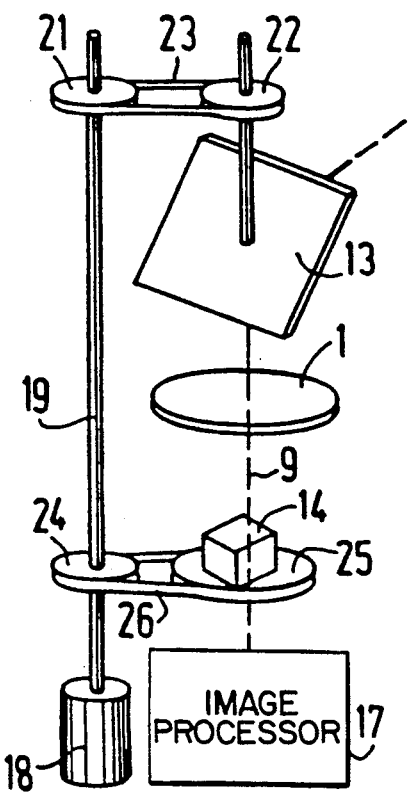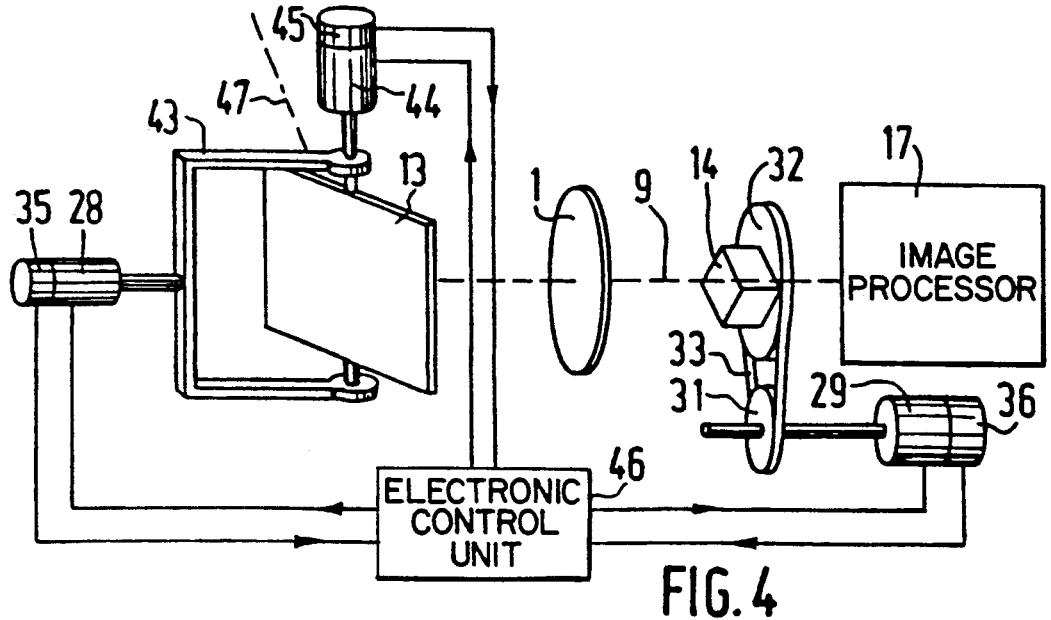
FIG. 1
FIG. 2
FIG. 4

INFRARED SURVEILLANCE DEVICE

BACKGROUND OF THE INVENTION

The present invention relates to optical scanners of the field of view of a scene observed by an infrared thermo-ographic system. Such systems generally include a first optomechanical device having an entrance objective, which focuses the infrared radiation on a plane of infrared detector(s) by means of a scanner comprising at least a slow raster scanning element that permits analysis of the scene by successive lines; and a second optomechanical device comprising a periscope-head mirror, tilted with respect to the optical axis of the entrance objective and able to turn about this axis, and a derotator turning at a rate one-half that of the head mirror. The system further includes electronic equipment for transforming the output signal from the detector(s) into a visible image of the field of view.

The present invention concerns such an optical scanner including an entrance objective, a reflecting mirror able to oscillate about a first tilting axis orthogonal to the optical axis of the aforesaid entrance objective and realizing slow raster scanning when it oscillates, a field lens, a prismatic drum turning about an axis orthogonal to the axis of the reflecting mirror and enabling a rapid scan, and a set of lenses and mirror that focus the infrared radiation on a plane of infrared detectors. The invention also relates to an infrared thermographic system making use of these optical scanners.

Devices of this type are used in particular in landscape visual display equipment, the landscape being perceived by infrared radiation at a wavelength longer than one micron. This visual display can be produced day or night, being in general more useful at night when direct vision is greatly reduced, or impossible. The spectral bands of radiation detected by these devices correspond to transparent atmospheric windows, either 3 to 5μ or 8 to 12μ. This latter spectral band is particularly related to the invention because it is perfectly adapted to the imaging of bodies at ambient temperature, a black body at 300° K. having its emission maximum in the vicinity of 10μ. Optical scanners for infrared thermographic system are described in Chapter 7, "Three-Dimensional Analysis Systems," Pages 219-248, in the book by G. Gaussorgues titled *La thermographic infrarouge* [Infrared Thermography], published by Technique et Documentation on Dec. 2, 1980.

It is known that infrared thermography cannot be used to convert received radiation into an electronic image on the scene, i.e., to use targets similar to photocathodes. This is because the received radiation is so lacking in energy that the electrons cannot be detached from the electrode, and that all the radiation can do is excite a photodiode, or a photoconductor. Thus it is impossible to obtain electronic scanning of an observable scene on a target, such as is the case with a television camera or a Vidicon tube. Optomechanical scanning thus is necessary to reconstruct the image of the scene and, as was the case for the first television cameras, this scanning consisting of systematic point by point scanning of the scene under observation, each point of the scene, termed an elementary field, ultimately being converted into a real image on the detector.

The present invention applies to scans of an approximately rectangular scanning field that consists of line scans and raster scans. In known conventional scanners, such as those previously discussed, slow raster scan is caused by a reflecting mirror placed behind the entrance objective moving at the rate of one image for each oscillation of the mirror about a first tilting axis. The line scan is caused by a rotating prismatic drum that can function in the transmission or in the reflection mode at the rate of one line for each rotation of the drum equal to $2\pi/m$, m being the number of prism faces.

These scanners can have one, or preferably several detectors, so that several lines can be obtained simultaneously. The electrical signals from the output of the detector(s) are processed to reconstruct an image of the scene, on a television receiver, for example, in which scanning of the screen by the electronic beam is synchronized with, and identical to, the scanning of the real image of the scene on the infrared detector. This mode of reconstruction of the scene termed the first or imagery mode. Scanners used for the imagery mode generally are adapted to the standards used in television, which, for example can be 25 images per second with each image being composed of 230,000 dots in 575 useful lines of 400 dots each. The objectives used generally have a small aperture angle, of the order of only a few degrees. This small field of view is necessary when high resolution is desired in order to capture in sufficient quantity the radiation flux emitted by the distant objects it is desired to identify.

This constraint is not well suited to a sector or panoramic scanning mode similar to that used in radars. Infrared monitoring has many problems: panoramic surveillance of the sky, and of the horizon terrestrial or maritime; and surveillance in a given sector. Such infrared surveillance could make it possible to replace radars when they are electronically jammed, or when their transmissions in the operating mode creates the risk of detection. Under these conditions it is conceivable that the infrared scanner could be made to operate in the imagery mode by causing it to pivot about itself in a sector or panoramic scan. The engineering problem thus posed is that of causing the system to rotate while at the same time retaining the connections with its accessories. In an infrared scanner the cooling system is indispensable for keeping the detectors at a low temperature. Interconnection of the rotative scanner and its cooling system as well as the electronic portions of the device (which comprise in particular the image reconstruction cathode ray tube (CRT) present substantial difficulties. Keeping the cooling system fixed poses connection problems that are virtually insoluble, and linking the rotation of the CRT to the movement of the optics complicates and increases the weight of the system, something that is very prejudicial. Also there is the need for a rotating electric collector ring assembly between the detector(s) and the associated electronic equipment.

Another approach that does not require rotation of the detectors involves the placement of a periscope-head mirror in front of the system and rotating about the optical axis of this system as indicated on pages 230 and 321 of G. Gaussorgues' book, already cited. Because the rotation of the head mirror introduces what is called image dumping (rotation of the image), it is necessary to rectify this image with a derotator, such as a Wollaston prism, a Péchan prism, or a Räntsch derotator, for example. The derotator should have a value of its angular position about the axis of the beam that is half that of the head mirror, that is, when the head mirror is rotating the instantaneous rotation rate of the derotator must be half that of the head mirror. The imagery mode however is retained in this form of operation such that raster scan is effected by the reflecting mirror, and line scan by the prismatic drum, and as noted, the imagery mode is ill-adapted to panoramic scan.

SUMMARY OF THE INVENTION

It is an object of the present invention to provide an infrared detection system with a capability for sector or panoramic surveillance like that of the radar.

This and other objects are achieved by the present invention by fixing the derotator initially in a different position with respect to the head mirror when the device is operating in the panoramic mode. The head mirror and derotator are coupled in a predetermined second angular position when operating in the panoramic or second mode of operation such that all rapid scan lines of the field of view scanned are substantially parallel to each other, independent of the pointing direction of the head mirror. The slow raster scan movement is obtained by maintaining the slow raster scan mirror in a fixed position, and by the simultaneous rotation of the head mirror (and coupled derotator) at rates such that the lines rapidly scanned on the scene observed are approximately adjacent.

Each line of the scene scanned is parallel to the tilting axis of the slow raster scan reflecting mirror, that is, it would be a horizontal line in the imagery or first mode. In accordance with the present invention, a second mode of operation utilizes the head mirror and derotator, although coupled for rotation at the same ratio, are oriented so that the image remains turned, preferably 90° with respect to its usual direction. Thus each line scanned by the prismatic drum corresponds to an apparent vertical line of the scene, and raster scan thus is accomplished by the rotational movement of the head mirror. It is necessary that the head mirror turn at a regular rate so as to obtain a homogeneous image, and that this rotation rate be compatible with the usual raster scan. Thus rotation could be approximately equal to that of the reflecting mirror oscillating in the imagery mode when the head mirror and the detrotator are immobile.

In a first embodiment of the present invention the means used for angular coupling are essentially mechanical with the axes of rotation of the head mirror and of the derotator being controlled by a single electric motor. This first embodiment is suitable principally for unique operation in the sector or panoramic scan mode (the second mode) in much the same manner as a conventional radar display. In accordance with a second embodiment of the present invention, the means used for angular coupling are electric and the head mirror and the derotator being set in motion by first and second electric motors, respectively, each motor fitted with a position indicator, with an electronic control utilized to regulate the mutual positions and speeds of the two motors. The second embodiment can have operation in the scan mode, or operation in the imagery mode, depending on needs with just a simple adjustment.

BRIEF DESCRIPTION OF THE DRAWINGS

A more complete appreciation of the invention and the attendent advantages thereof will be readily apparent by reference to the accompanying drawings wherein:

FIG. 1 is a perspective view showing the principle of operation of the optical scanner in accordance with the invention;

FIG. 2 is a perspective view of a first embodiment of the invention;

FIG. 4 is a perspective view of a third embodiment of the invention; and

DETAILED DESCRIPTION OF PREFERRED EMBODIMENTS

Figure 3:
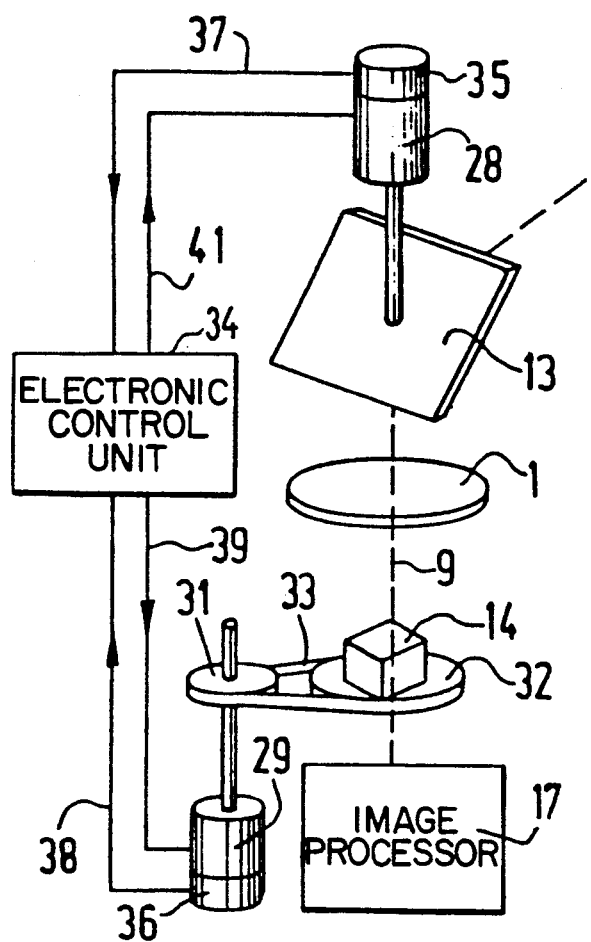
FIG. 3 is a perspective view of a second embodiment of the invention.

The same numbers in the figures designate the similar elements with similar functions in the various Figures.

FIG. 1 represents an infrared thermographic system for which the optical scanner of a field of view has been detailed. The optical scanner comprises a fixed entrance objective symbolized by a single lens 1, raster scanning reflecting mirror 2 that can be oscillated in accordance with a reciprocating motion with small amplitude about tilting axis 3 in the two directions of rotation as indicated by double arrow 4, fixed field lens 5, line scan prismatic drum 6, and an exit objective schematically shown by a single fixed lens, 7, that focuses the infrared radiation on a plane of infrared detectors 8. Lens 1 has optical axis 9 which is orthogonal to axis 3 (in this case perpendicular at a point in mirror 2). Prismatic drum 6 has a great many lateral reflecting faces, 11, preferably regularly distributed about axis of rotation 12. It can function by transmission, in which case it is transparent to infrared radiation, or by reflection, as shown in FIG. 1, where faces 11 are reflecting.

In the first or imagery mode, mirror 2 effects slow raster scan of the field of view at the rate of one image per oscillation, and drum 6 effects rapid line scan in a direction approximately perpendicular to the raster scan at the rate of one line (or of several lines if several detectors are installed in parallel) per passage of each face in front of field lens 5, said scan lines generally corresponding to horizontal lines that appear to be superimposed on the field of view. After focusing by exit objective 7, the actual infrared image of the scene, in approximately rectangular form, thus takes shape, dot by dot, on a detector, or on a group of fixed infrared detectors 8. The optical scanner also has a periscope-head mirror, 13, that traverses optical axis 9, and is tilted with respect to the latter and can turn about this axis. This rotary motion enables mirror 13 to provide a panoramic view of the landscape, thus avoiding the need to turn the optical scanner assembly. This is an advantage, but this rotation does introduce image dumping, that is, rotation of the image on itself about axis 9, which is unacceptable for displaying this image. A derotator, 14, which can turn about axis 9, is introduced in known fashion to compensate for image dumping. Broken lines 10 in FIG. 1 indicate the path of the infrared rays through the optical scanner.

Several optical scans of the field of view are possible by the scanner described above according to the relative movements it communicates to mirrors 2 and 13 and to derotator 14. Conventional scanning operation is in what is called the first or imagery mode, where an apparent horizontal line of the field of view is restored in the form of a horizontal line on detector(s) 8. The initial relative positions of head mirror 13 and derotator 14 must be adjusted in advance to obtain this operation. If it is assumed that mirror 13 is set in a given fixed position, it is then necessary to fix derotator 14 in a position in rotation such that the image is restored at 8 in order to have a proper scan when element 2 is in oscillatory motion and element 6 is in rotary motion. This would be the same as that which would be obtained in the presence of the derotator and of the head mirror and the scanner being assumed as having been turned 90° in the retrograde direction with respect to its position in FIG. 1, which, in the usual fashion, consists in the restoration of the apparent horizontal lines of the scene in the form of horizontal scan lines, and the apparent vertical lines of the scene in the form of vertical alignments of dots. Commencing with this initial adjustment position, if the head mirror then is caused to turn through a given angular value, derotator 14 must turn through one-half the angle in order for the real image restored at 8 to retain the same vertical and horizontal properties. Scanning thus accomplished results in obtaining images through the referenced electronics, 15, comprising a visualization screen that transforms the signal from the output of detector(s) 8 via cable 16 into visible images in known fashion. If mirror 13 is caused to rotate about axis 9 in a manner similar to that of a classic motion picture or television camera, it is necessary that derotator 14 retain an instantaneous rotation rate one-half that of mirror 13 as of the initial adjustment described above.

What has been described above is operation in the first or imagery mode in which mirror 2 ensures raster scan only, just as would be the case for the usual scanner if derotator 14 and mirror 13 were absent. The present invention also realizes raster scan with mirror 13 in a manner such that what is obtained is panoramic scanning similar to that obtained with radar for panoramic or sector surveillance of the scene (second mode operation). This is arrived at by making an initial adjustment of the relative position in rotation of head mirror 13 and of derotator 14 at a predetermined angle different from that described above for the first or imagery mode. Specifically the convergent beam received by mirror 2 is turned through said predetermined angle and preferably 90° with respect to that found in the imagery mode, which is tantamount to saying that mirror 2 no longer instantaneously feeds back to prismatic drum 6 through field lens 5 an apparent horizontal line from the scene, but rather an oblique one, or, preferably, an apparent vertical line. To turn the image 90° by the derotator means that the derotator must present an angular displacement of ±45° modulo 180° with respect to that which it had in the imagery mode (see above) i.e., there are four possible positions. Two possible reversals of the image, in pairs, 180° apart, correspond to these four positions. Given the convention selected for the representation of the image at display 15, only one of the two reversals of the image is suitable if, for instance, two possible positions for derotator 14 are displaced 180° with respect to each other.

The adjustment in operation of mirrors 2 and 13 and derotator 14 are as follows. Reflecting mirror 2 is fixed, preferably in its median position, about axis 3, and head mirror 13 is rotated in either direction at a uniform rate. Given these conditions, derotator 14 must turn in the same direction as head mirror 13 at a uniform rate that is rigorously one-half that of mirror 13. The result thus is scanning on detector(s) 8 in directions perpendicular with respect to the direction of scan in the imagery mode, that is, horizontal lines at 8 correspond to apparent vertical lines of the scene, and raster scan, in a direction approximately perpendicular to the line scan, corresponds to a horizontal movement of the lines of the scene and is no longer vertical as is the case in the imagery mode which was the result of the oscillation of reflecting mirror 2.

It will be noted that the image of the scene is inverted 90° with respect to that in the imagery mode, and that if no special measure is taken to display the information in the panoramic mode it would move the apparent panoramic horizontal image of the scene vertically on the display screen that is part of electronics 15, and would do so in the direction of, or in the direction opposite to, the direction of rotation of head mirror 13. However, as will be described in what follows, special measures for the display have been taken in this case, these measures able to include erecting the image, if necessary, or, more generally, a display similar to that of radar echoes. Also to be noted is the fact that the direction of the line displayed at 15 depends on the direction of rotation of prismatic drum 6. Depending on the rate of rotation of mirror 13, the juxtaposed lines reproduced at 8 can overlap, they can be adjacent, or they can be disjointed. The lines preferably are adjacent, and to this end the rate of rotation of mirror 13 must be selected equal to that, denoted $v_0$, that would be imparted to reflecting mirror 2 for raster scan in the imagery mode during the greater part of its period of oscillation during which each image is scanned. It will be noted that what also has been obtained is a continuous image of the scene. Whereas in the imagery mode the rapid return of reflecting mirror 2 marked the passage from one image to the next (generally the same image, or approximately the same part of the scene), in the panoramic scan mode conforming to the invention, on the contrary, the idea of separate images comprising a constant predetermined number of lines no longer exists because the movement of mirror 13, which ensures raster scan, can be continuous. Since this movement is continuous, the result is panoramic scan over 360° of the scene. It also is possible, in accordance with the invention, to obtain sector scan by imparting to mirror 13 any desired oscillatory movement in rotation between the preselected angular positions. The return of mirror 13 from one angular position to another, in a direction opposite to the direction of rotation at rate $v_0$ preferable is made at a rate rapid with respect to $v_0$, the return time preferably not being used to restore a visible image from the infrared radiation received by the system.

It is to be noted that this panoramic, or sector (second) mode of operation poses the same problem of displaying the information that is present in displaying radar echoes, this problem being due on the one hand to the very high number of elementary dots per unit of processing time associated with weak redundance with respect to that obtained in the imagery mode, and on the other hand to the low rate of system operation. This means that in the general case special processing of the information must be conceived and adapted for this mode of operation prior to display. This processing, which, in its general terms, is known for the restoration of radar images, can assume several forms, such as the elimination of extended zones, filament-like structures which, in radar imagery, correspond to fixed echoes, in a manner such as to favor dots, or those that use algorithms based on the statistical properties of targets and background, these types of processing taking place in real, or quasi-real time. These types of information processing can be associated with doubt removal systems, such as the return in the imagery mode, or the use of telemetry to obtain target speed and range, for example.

Described below is a numerical application that shows the compatibility of a conventional infrared thermographic system adapted to European television receiver standards with infrared panoramic or sector scanning systems. The infrared thermographic system selected by way of example analyzes the scene in the imagery mode by blocks of several lines at one time, something that makes it possible to reduce proportionally the rate of rotation of prismatic drum 6. The analysis is made simultaneously at the rate of 11 lines, for example, which corresponds to at least 11 detectors arranged vertically in a manner not shown at 8 in FIG. 1. On the other hand, several infrared detectors can be arranged in a line, preferably in known fashion, for example, four detectors placed side by side along each line, in order to upgrade system integration capacity. In operation, the signals at the outputs of the four elements are summed after being brought into phase at the end of each time interval, $\tau$, which corresponds to a dot on the line to be visualized, and to an angular value module in the scene, called the elementary field, this time interval corresponding from a practical point of view to the time it takes the infrared radiation from a point in the scene to pass from one detector to the adjacent detector. Phasing is realized by delay lines that connect three of the four detectors in a line to the summer associated with this line, the values of these delays being $3\tau$, $2\tau$, and $\tau$ in the order that corresponds to the direction of passage of the radiation by the detectors concerned. Obtained as well from the outputs of 11 summers are 11 parallel signals that are stored in two series-parallel registers alternately at the line scanning rate, one of the registers furnishing the 11 lines already stored in series at a rate faster by a factor of 11 to cable 16, while the other register is being loaded with the following 11 lines, then reciprocally. The lines are then arranged in series at the output of a signal organization module, which is not shown but which can be associated with detectors 8, and are supplied to electronics 15 at a regular rate. The use of four detectors per line doubles system sensitivity. Each line comprises 400 dots, for example, for an angular width of the field in the line direction between 2.2° and 45°. This angular width, $\theta$, here is assumed equal to 5°. The rate in the imagery mode is 25 images per second, the period of oscillation of reflecting mirror 2 is 20 ms per raster, even or odd, and each image comprises 510 useful lines and a return time corresponding to the duration of 115 lines. It being given that there is no image return in the panoramic scan mode, the rate of scan in number of lines per second is equal to $$25(510+15,625 \text{ lines/second},$$

for contiguous 11 line blocks.

On the other hand, the angular width, $\alpha$, of an elementary field that corresponds to the spacing between two dots of the image in the line direction, or in the raster direction, calculated along a line, is $$\alpha = \theta/400°.$$

Now the scanning rate, $v_0$, can be determined $$v_0 = 15,625(\theta/400) = 39.06 \ \theta°/s.$$

and for $\theta = 5°$, $v_0 = 195.3°/s$, or one revolution every 1.84 seconds. When $\theta = 10°$ we would obtain one revolution in 0.92 seconds. These orders of magnitude correspond to values currently realized in surveillance systems.

So far as the orders of magnitude of the sensitivity of the infrared surveillance system are concerned, the following observations and a calculations can be made. In general, the concept of NEI or NEP (Noise Equivalent Irradiance, or Noise Equivalent Power), expressed in W/m$^2$ in the plane of the entrance pupil, is used to evaluate the sensitivity of a surveillance system against air targets, for example. The calculation can be made quite easily with a conventional infrared thermographic system, certain characteristics of which already have been mentioned above. This calculation is $$NEP = \frac{\sqrt{S} \sqrt{\Delta F}}{\sqrt{n} \ D^*} \ \frac{1}{t} \text{ in watts}$$

where
S is the detector surface, $(0.0035)^2$ cm$^2$;
n is the number of detectors, $4 \times 11 = 44$;
t is the optical transmission, 0.7;
$D^* \leq 3.5 \ 10^{10}$ in cm$\times$Hz$^{\frac{1}{2}} \times$W$^{-1}$;
$\Delta F = \pi/2 \ 400/2 \ 15,625$ in Hz.
and from whence $$NEP = 4.77 \cdot 10^{-11} W$$

With a pupil 150 mm in diameter, the surface of which is denoted S, $$NEI = \frac{NEP}{S_p} = 2.7 \cdot 10^{-9} \ W/m^2 = W/m^2 = 3 \cdot 10^{-9} \ W/m^2$$

This order of magnitude is equally compatible with surveillance systems. By way of an example, assume that infrared panoramic surveillance is being used to find the minimum range, or detection range, d, of an aircraft coming in at low altitude and radiating I=100 watts per steradian in the 8 to 12$\mu$band. The atmosphere can be said to have an absorbtion coefficient of $\sigma = 0.24$ km$^{-1}$. The permissible false alarm rate is $2.8 \cdot 10^{-4}$ times per second, and the detection probability (automatic) should be 0.9. All calculations being made, the result is a minimum signal-to-noise ratio, S/N, of 8. The minimum received energy needed for detection, R, can be calculated in two ways $$R = \frac{S}{B} \times NEI, \text{ or } R = 8 \times 3 \cdot 10^{-9} = 2.4 \cdot 10^{-8} \ W/m^2$$

or $$R = \frac{I}{d^2} e^{-\sigma d}$$

The value of d can be deduced from the above two equations as $$d = 13.3 \text{ km}.$$

The detection range, d, for a helicopter raditing 15 watts per steradian should be 8.8 km. It should be noted that with a 150 mm diameter entrance pupil the angular width of the field in the line direction is equal to 3.35°. In this case the analysis rate, $v_0$, is 130.89°/s, or one revolution in 2.75 s.

The imagery analysis (first) and panoramic surveillance (second) modes can, or cannot, be compatible, depending on the manner in which head mirror 13 and derotator 14 are set in motion, and as described below with reference to FIGS. 2 and 3, in which the block 17 symbolizes the image processor, elements 2, 3, 5-8, 11, 12, 15, and 16, and each of which respresents only one embodiment of the means used for angular coupling between head mirror 13 and detrotator 14.

FIG. 2 shows one means used for angular coupling. Electric motor 18 drives head mirror 13 at speed $v_0$ and derotator 14 at speed $v_0/2$ simultaneously through common output shaft 19. The drive can be by pulleys and belts. Pulleys 21 and 22 are connected by belt 23 to drive mirror 13, and pulleys 24 and 25 are connected by belt 26 to drive derotator 14, the reduction ratio between pulleys 21 and 22 on the one hand, and 24 and 25 on the other, being calculated to satisfy the condition for the speeds indicated above. For example, and as shown in FIG. 2, pulleys 21, 22, and 24 have the same groove diameter, whereas pulley 25 has a groove diameter double that of the other three pulleys. This 1:2 ratio in rotation rates of elements 14 and 13 should be maintained rigorously constant. It can be desirable to accomplish the drive by gears, the tooth ratios of which are appropriate. In order to operate in the panoramic or sector mode, it is necessary to adjust, modulo 180°, the initial relative positions between derotator 14 and mirror 13 to obtain the orientation of the lines conforming to analysis in the second mode in accordance with the invention, as indicated above. In this mode of realization reflecting mirror 2 is stopped, and, since it no longer performs the raster scan function, can itself be omitted. This omission requires that axes 9 and 12 are made perpendicular to the center of symmetry of prismatic drum 6. It will be noted that if reflecting mirror 2 is retained, the first or imagery mode remains possible, as long as an image on the screen turned 90° with respect to the image received by mirror 13 is acceptable. It is sufficient, in order to obtain this operation, to impart to mirror 2 its raster scan oscillatory motion, mirror 13 then being immobilized, or animated, at some rotation rate.

The angular coupling arrangements shown in FIG. 3 are electrical and require two motors, one motor, 28, for driving (directly, for example) head mirror 13, the other motor 29, for the indirect drive of derotator 14 through pulleys 31 and 32 and belt 33, or through gearing. In this case the relative positions of the head mirror and derotator are controlled by electronic control unit 34 which makes it possible to obtain the direction of lines analyzed on the landscape independent of the position of head mirror 13. Thus, the direction of the lines can be vertical in the second or panoramic surveillance mode, and horizontal in the first or imagery mode, and thus facilitate the display on a conventional television receiver. The provision of an electronic control unit 34 is well within the level of skill in the control art.

In order to obtain the desired operations described above, motors 28 and 29 each have a position detector, 35 and 36, respectively. These detectors convert the relative positions of elements 13 and 14 into electrical signals. These signals are fed into unit 34 through cables 37 and 38, respectively, and are compared. An automatic control loop that takes into account the deviation between the real relative positions of elements 13 and 14 and the desired relative positions makes it possible to adjust one motor, preferably motor 29 through cable 39 in order to reduce in the deviation, with the control of motor 28 itself being ensured by cable 41. The shafts of motors 28 and 29 are not mechanically coupled in the embodiment shown in FIG. 3, so the scanner can be operated just as well in the second or panoramic surveillance mode as it can in the first or imagery mode.

The FIG. 3 scanner is shown operating in the panoramic surveillance mode, that is, with the instantaneous relative positions of elements 2, 13, and 14 identical with those described above with reference to FIG. 2. However, the transition to the imagery mode, designed to provide an image in a predetermined direction, would be made as follows, under control of the electronic control unit. Mirror 13 is stopped on the desired predetermined bearing, for example, on the bearing on which a hot target has been detected in the panoramic mode. Derotator 14, which was stopped at the same time as mirror 13, then is turned +45° or −135°, or −45° or 135° (±45°, modulo 180°), depending on the initial inversion made of the image of the field of view for analysis in the panoramic mode, such as to cause the image to rotate 90°. Reflecting mirror 2 is restarted to provide raster scan. The transition from the imagery scan mode back to the panoramic mode is accomplished in the reverse order of that described above.

FIG. 4 shows a further embodiment of the invention that makes it possible to ensure the operations of the scanner described above with reference to FIG. 3, but with additional capabilities. Head mirror 13 in FIG. 4 is mounted so it is movable in universal joint 43 under control of a third electric motor, 44, fitted with position indicator 45. Motor 44 receives its supply from electronic unit 46, which receives in return the indication of the rotational position of motor 44. The electrical connections between units 44,45, and 46 are very simply schematized in FIG. 4. In practice, these connections are made by cables, not shown, that are integral with universal joint 43. A set of rings and brushes, not shown, is necessary on the shaft of motor 28 and on the shaft of motor 44. It is possible to control the line of sight, in two angular directions, (for example elevation and azimuth) and to scan a large part of the sphere that comprises the complete apparent field of view with complete independence between the line of sight and system orientation. As a matter of fact, in accordance with the embodiment of FIG. 4 as positioned, motor 28, as it drives universal joint 43 and causes it to rotate, will cause the sight angle to turn, that is, axis 47 in the vertical direction, or in elevation, but introduces image dumping. This dumping can be compensated for by rotation of derotator 14 by motor 29. Rotation of the mirror by motor 44 causes the sight angle to turn in the horizontal direction, or azimuth, but this does not cause image dumping. It is possible, by combining the movements of mirror, universal joint, and derotator, to scan a large part of the sphere with different orientations of the scan lines.

Figure 5:
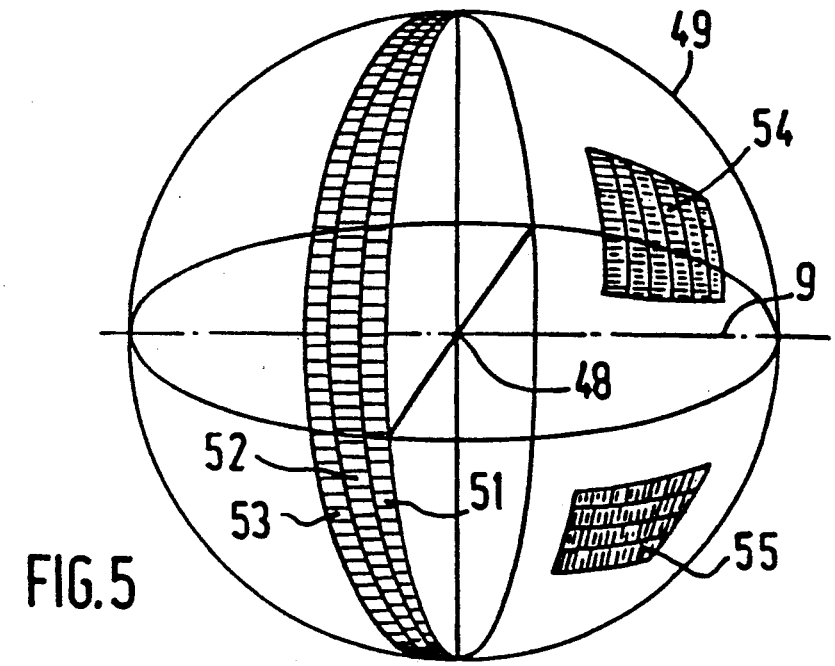
FIG. 5 is a perspective view of a sphere illustrating the field of view scanning modes that are possible with the present invention.

FIG. 5 shows some examples of various possible scanning modes of the embodiment shown in FIG. 4 with the scanner assumed as being placed at center 48 of sphere 49, with the same orientation as that shown in FIG. 4. Number 51 indicates surveillance of a band with a width of one line along a great circle of sphere 49 by rotation of universal joint 43 around axis 9, the scanning lines being parallel to axis 9, the operation being identical to that described with reference to FIG. 3, but with the shown change in orientation of axis 9. It is possible to scan the sphere by bands 52, 53, etc., which extend approximately along the meridians and which are, preferably, adjacent, at least at the equator, by the slow tilting of the mirror by motor 44, continuously, or stepped, at the rate of one step per band. It also is possible to observe a solid angular zone, such as 54 or 55, bounded by four arcs of great circles perpendicular to each other in pairs. The surveillance mode designated 54 is obtained by the limited continuous rotation of the universal joint, which is accompanied by a rapid return and, after each return, by a step rotation of mirror 13 by motor 44, the lines being parallel to each other and parallel to axis 9 in a cylindrical projection (not shown). It will be noted that the scanner in FIG. 4 also provides for the surveillance mode numbered 55, in accordance with which the movements of motors 28 and 44 are reversed with respect to those described above for the surveillance of zone 54. The lines on sphere 49 are orthogonal to axis 9 in this latter case. The derotator accompanies the movements of the universal joint to maintain the lines in the correct direction for the surveillance of zones such as 54 or 55, at practically any point on the sphere other than places occulted by the optical scanner itself.

Derotator 14 can be a dihedron, or a Péchan or Wollaston prism made of a suitable material, or a system of cylindrical lenses, or any other image erecting system. It is preferred that a Räntsch prism be used, as described in Dr. D. W. Swift's article titled "Proceedings of the Technical Programme" published in *Electrooptics 71 International Conference*, pages 33 to 43, a conference that was held in Brighton, England, Mar. 23, 24, and 25, 1971. This type of derotator has optical path length short enough so it can be inserted between objective 1 and the scanning system at a place where the beam of infrared radiation is relatively focused, and this makes it possible to use a derotator with smaller dimensions. However, it goes without saying that the derotator can be placed at any point on the optical trajectory of the infrared radiation located upstream from part 17 of the scanner. On the other hand, the invention is not limited to scanning systems with two mechanical movements comprising a reflecting mirror that can be oscillated and a rotating prismatic drum, but rather can be applied as well to scanning systems with just one mechanical movement that have only a reflecting mirror and at least a number of detectors for the image lines such that the rate is at least one detector per line.

Thus, and in view of the above disclosure, many modifications and variations of the present invention will become obvious to those of ordinary skill in the art. The present invention is limited only in accordance with the appended claims:

We claim:

1. A thermographic scanner of a field of view of a scene observed by an infrared thermographic system, said scanner comprising:

a first optomechanical means including (a) at least one infrared detector located in a plane, (b) an entrance objective means, having an optical axis, for focusing infrared radiation on said plane of at least one infrared detector, (c) rapid scan means for providing rapid line scanning, and (d) raster scanning element means in a first mode of operation for incrementally adjusting successive scan lines in a direction perpendicular to said scan lines;

a second optomechanical means including (a) means for changing direction of infrared radiation from said scene to said optical axis of said entrance objective, (b) derotator means, and (c) means for rotating said changing means about said optical axis at a first speed, for rotating said derotator means at a second speed equal to one-half said first speed, and for orienting said derotator means at a first initial predetermined angle with respect to said changing means in a first mode of operation, and for orienting said derotator means at a second initial predetermined angle with respect to said changing means in a second mode of operation such that scan lines in said second mode of operation are orthogonally arranged with respect to scan lines during said first mode of operation, independent of said changing means position.

2. A thermographic scanner in accordance with claim 1, wherein said raster scanning element means comprises a reflecting mirror oscillatory about a first tilting axis orthogonal to said optical axis;

said rapid scan means comprises a prismatic drum and means for rotating said drum about an axis orthogonal to said first tilting axis, said entrance objective means comprising lens and mirror means for focusing said infrared radiation on said plane.

3. A thermographic scanner in accordance with one of claims 1 or 2, wherein said means for rotating comprises a mechanical means for rotating said changing means and said derotator means, said mechanical means including a single electric motor.

4. A thermographic scanner in accordance with one of claims 1 or 2, wherein said means for rotating comprises:

a first electric electric motor means for rotating said changing means;

a second electric motor means for rotating said derotator means;

a first position indicator means responsive to said first electric motor means position;

a second position indicator means responsive to said second electric motor means position; and an electronic control unit means, responsive to said first and second position indicating means, for adjusting initial relative position and mutual speeds of said electric motors.

5. A thermographic scanner in accordance with claim 4, wherein said electronic control unit means includes means for supplying an adjusting signal to at least one of said first and second electric motors to vary the initial alignment of said changing means and said derotator means in said first mode by an angular amount equal to 45° modulo 180° from an initial alignment in said second mode, said electronic control unit means further including means for initiating movement of said raster scanning element means in said first mode of operation.

6. A thermographic scanner in accordance with claim 5, wherein said electronic control unit means includes means for maintaining said changing means and said derotator means immobilized.

7. A thermographic scanner in accordance with one of claims 1 or 2, wherein said changing means comprises a periscope head mirror having a plane of reflection and mounted in a universal joint capable of rotation about a first axis and a second tilting axis, said first axis coincident with said optical axis and said second tilting axis is in said plane of reflection and perpendicular to said optical axis.

8. A thermographic scanner in accordance with claim 7, wherein said means for rotating comprises:
- a first electric motor means for rotating said periscope head mirror about said first axis;
- a second electric motor means for rotating said derotator means;
- a third electric motor means for rotating said periscope head mirror about said second tilting axis;
- a first position indicator means responsive to said first electric motor means position;
- a second position indicator means responsive to said second electric motor means position;
- a third position indicator means responsive to said third electric motor means position; and
- an electronic control unit means, responsive to said first, second and third position indicator means, for adjusting initial relative position and mutual speeds of rotation of said electric motors.

9. A thermographic scanner in accordance with claim 8, wherein said electronic control unit means further includes means for operating said first and third electric motors during said second mode of operation in a continuous rotation and stepped manner, respectively.

* * * * *